(12) United States Patent
Todd et al.

(10) Patent No.: US 10,855,778 B2
(45) Date of Patent: Dec. 1, 2020

(54) DISTRIBUTED LEDGER FOR EDGE SERVER MANAGEMENT

(71) Applicant: EMC IP Holding Company LLC, Hopkinton, MA (US)

(72) Inventors: Stephen J. Todd, Center Conway, NH (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 178 days.

(21) Appl. No.: 16/176,749

(22) Filed: Oct. 31, 2018

(65) Prior Publication Data
US 2020/0137176 A1  Apr. 30, 2020

(51) Int. Cl.
*H04L 29/08* (2006.01)
*H04L 29/06* (2006.01)
*H04L 9/06* (2006.01)

(52) U.S. Cl.
CPC ............ *H04L 67/16* (2013.01); *H04L 9/0618* (2013.01); *H04L 63/0428* (2013.01); *H04L 63/10* (2013.01); *H04L 2209/38* (2013.01)

(58) Field of Classification Search
CPC ..... H04L 63/10; H04L 2209/38; H04L 67/16; H04L 63/0428; H04L 9/0618; H04L 9/3239; H04L 67/10; H04L 2209/805
See application file for complete search history.

(56) References Cited

U.S. PATENT DOCUMENTS

| | | | |
|---|---|---|---|
| 2014/0006783 A1* | 1/2014 | Zhang | H04L 63/0869 713/168 |
| 2018/0103013 A1* | 4/2018 | Imai | H04L 63/08 |
| 2018/0253130 A1* | 9/2018 | Murray | G06F 1/1635 |
| 2019/0089729 A1* | 3/2019 | Nishi | H04L 63/1416 |
| 2019/0102409 A1* | 4/2019 | Shi | G06F 16/27 |
| 2019/0104196 A1* | 4/2019 | Li | G06F 9/5077 |
| 2019/0199787 A1* | 6/2019 | Carver | H04L 67/2842 |
| 2019/0207781 A1* | 7/2019 | Harpur | G06F 40/20 |
| 2019/0319861 A1* | 10/2019 | Pan | G06Q 20/405 |
| 2019/0363938 A1* | 11/2019 | Liebinger Portela | H04L 41/12 |
| 2019/0372985 A1* | 12/2019 | Zamora Duran | H04L 63/123 |
| 2019/0373339 A1* | 12/2019 | Bradley | G06F 16/1805 |
| 2020/0019626 A1* | 1/2020 | Todd | G06F 16/1805 |

OTHER PUBLICATIONS

Satoshi Nakamoto, "Bitcoin: A Peer-to-Peer Electronic Cash System," http://bitcoin.org/bitcoin.pdf, 2008, 9 pages.
(Continued)

*Primary Examiner* — Abdullahi E Salad
(74) *Attorney, Agent, or Firm* — Ryan, Mason & Lewis, LLP

(57) ABSTRACT

In a system comprising a set of gateway devices operatively coupled to a set of edge servers, a method obtains data at a given one of the edge servers, wherein at least a portion of the data comprises valuation data attributable to at least one of the one or more gateway devices. The method sends the data from the given one of the edge servers to a blockchain or distributed ledger shared by the set of edge servers for storage of the data on the blockchain. Such a method provides blockchain-based edge server value management that enables a single view of cross-edge operational and value contributions associated with the set of edge servers in the system.

20 Claims, 7 Drawing Sheets

(56) References Cited

OTHER PUBLICATIONS

U.S. Appl. No. 15/072,557, filed in the name of Stephen J. Todd et al. filed Mar. 17, 2016 and entitled "Metadata-based Data Valuation."
U.S. Appl. No. 15/135,817, filed in the name of Stephen J. Todd et al. filed Apr. 22, 2016 and entitled "Data Value Structures."
U.S. Appl. No. 14/863,783, filed in the name of Stephen J. Todd et al. filed Sep. 24, 2015 and entitled "Unstructured Data Valuation."
U.S. Appl. No. 15/136,327, filed in the name of Stephen J. Todd et al. filed Apr. 22, 2016 and entitled "Calculating Data Value via Data Protection Analytics."
U.S. Appl. No. 15/135,790, filed in the name of Stephen J. Todd et al. filed Apr. 22, 2016 and entitled "Data Valuation at Content Ingest."
Doug Laney, "The Economics of Information Assets," The Center for Infonomics, Smarter Companies presentation, Sep. 2011.
U.S. Appl. No. 16/163,717, filed in the name of Stephen J. Todd filed Oct. 18, 2018 and entitled "Data Valuation and Sensor Data Management."

\* cited by examiner

```
┌─────────────────────────────────────┐
│ IN A SYSTEM COMPRISING A SET OF     │
│ GATEWAY DEVICES OPERATIVELY COUPLED │
│ TO A SET OF EDGE SERVERS, OBTAINING │
│ DATA AT A GIVEN ONE OF THE EDGE     │─ 702
│ SERVERS, WHEREIN AT LEAST A PORTION │
│ OF THE DATA COMPRISES VALUATION     │
│ DATA ATTRIBUTABLE TO AT LEAST ONE   │
│ OF THE ONE OR MORE GATEWAY DEVICES  │
└─────────────────────────────────────┘
                   │
                   ▼
┌─────────────────────────────────────┐
│ SENDING THE DATA FROM THE GIVEN ONE │
│ OF THE EDGE SERVERS TO A BLOCKCHAIN │
│ SHARED BY THE SET OF EDGE SERVERS   │─ 704
│ FOR STORAGE OF THE DATA ON THE      │
│ BLOCKCHAIN                          │
└─────────────────────────────────────┘
```

FIG. 8

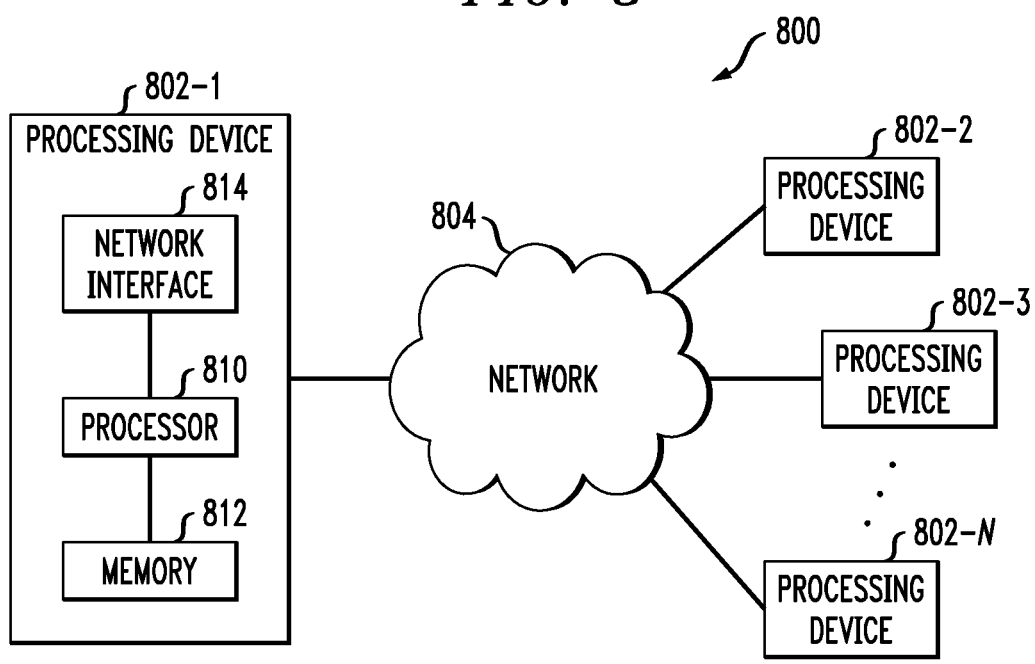

DISTRIBUTED LEDGER FOR EDGE SERVER MANAGEMENT

FIELD

The field relates generally to networks of computing resources, and more particularly to techniques for data management in such networks of computing resources.

BACKGROUND

Enterprises or other entities typically have a large information technology (IT) infrastructure comprising a network of computing resources distributed across a geographic environment. In some scenarios, these computing resources are mobile and may be referred to as mobile compute platforms. These mobile compute platforms, along with servers and devices that communicate with the mobile compute platforms, collectively form a highly distributed system.

For example, in some scenarios, mobile compute platforms function as gateways that connect Internet of Things (IoT) devices (e.g., sensors, tags, other monitoring or display systems, actuators, etc.) to edge servers. The edge servers then communicate with cloud platforms that are managed by or otherwise host application programs (e.g., analytics or other applications) associated with an enterprise. The applications utilize the data received from the IoT devices and, in some cases, send data to the IoT devices to influence some action. Mobile compute platforms can come in a variety of forms including, but not limited to, employee mobile devices, customer mobile devices, and vehicles (e.g., drones, planes, cars, trucks, other shipping transports, etc.). Further, mobile compute platforms can, themselves, be IoT devices.

As data increasingly streams in from IoT sensors into "islands" of geographically dispersed edge servers, the ability to effectively manage each edge server installation becomes increasingly difficult.

SUMMARY

Embodiments of the invention provide techniques for edge server management in a highly distributed system.

For example, in an illustrative embodiment, a method comprises the following steps. In a system comprising a set of gateway devices operatively coupled to a set of edge servers, the method obtains data at a given one of the edge servers, wherein at least a portion of the data comprises valuation data attributable to at least one of the one or more gateway devices. The method sends the data from the given one of the edge servers to a blockchain shared by the set of edge servers for storage of the data on the blockchain.

Advantageously, illustrative embodiments provide a blockchain-based edge server value management system and methodology that enables a single view of cross-edge operational and value contributions associated with the set of edge servers in the system. The term blockchain is used interchangeably herein with the term distributed ledger.

These and other features and advantages of the invention will become more readily apparent from the accompanying drawings and the following detailed description.

BRIEF DESCRIPTION OF THE DRAWINGS

FIG. 7 illustrates a methodology for managing edge server configuration value associated with a highly distributed system according to illustrative embodiments.

FIG. 8 illustrates a processing platform used to implement a highly distributed system with edge server configuration value management according to an illustrative embodiment.

DETAILED DESCRIPTION

Figure 1:
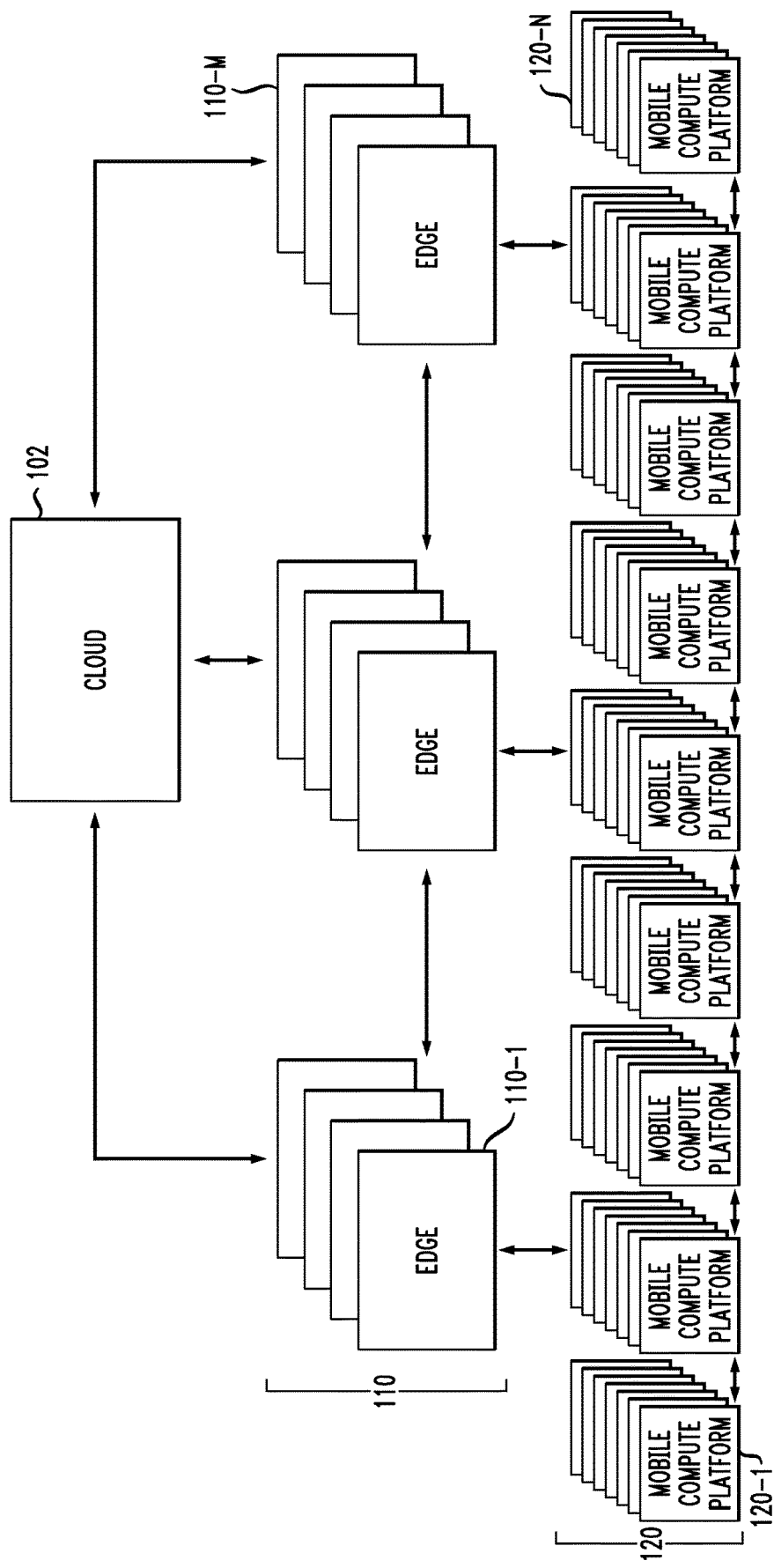
FIG. 1 illustrates a highly distributed system environment with which one or more illustrative embodiments are implemented.

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device of a computing system or some other form of cloud computing platform;

"structured data" as utilized herein is intended to be broadly construed so as to encompass, for example, data that resides in fixed fields within a document, record or file, e.g., data contained in relational databases and spreadsheets; and "unstructured data" as utilized herein is intended to be broadly construed so as to encompass, for example, data that is not considered structured data (in which case, some "semi-structured" data asset may also be considered unstructured data), e.g., documents, free form text, images, etc.; and "metadata" as utilized herein is intended to be broadly construed so as to encompass, for example, data that describes other data, i.e., data about other data.

As mentioned above, mobile compute platforms function as gateways that connect IoT devices to edge servers. Data collected from sensors is often aggregated on a gateway computing node or device (hereinafter, "gateway") before being forwarded on to edge servers and then, for example, to analytic engines. The term "gateway" is intended to be broadly construed so as to encompass, for example, a computing node that enables data communications between at least two discrete networks. In illustrative embodiments, a gateway enables data communication between a network of sensors and an edge server. In illustrative embodiments, an "edge server" is a computing device that functionally resides at the edge of a computing platform (e.g., a cloud computing platform) that is configured to send data outside of the computing platform and receive data from outside the computing platform.

As further mentioned, data increasingly streams in from IoT sensors into "islands" of geographically dispersed edge servers. As such, the ability to effectively manage each edge server installation becomes increasingly difficult. Illustrative embodiments provide techniques for managing edge servers by using a globally distributed ledger to track edge server performance, effectiveness, and value in relation to other linked edge server locations in a highly distributed system.

An example of a highly distributed system environment is shown in FIG. 1. As shown in FIG. 1, highly distributed system environment 100 comprises a cloud platform 102 operatively coupled to an intermediary layer 110 with a plurality of edge servers 110-1 through 110-M, which are operatively coupled to computing resources in a bottom layer 120 that are part of a plurality of mobile compute platforms (MCPs) 120-1 through 120-N. Note expressly shown are IoT devices that are operatively coupled to each MCP. However, as mentioned above, an MCP may itself be an IoT device. The cloud platform 102 may comprise a public cloud or a private cloud. Examples of public clouds may include, but are not limited to, Amazon Web Services® (AWS), Google Compute Engine® (GCE), and Windows Azure® Services platforms. The highly distributed system environment may employ heterogeneous and varied network connections, from carrier-grade service level agreement (SLA)-capable networks to torrent-like, peer-to-peer networks.

Furthermore, the highly distributed system environment may comprise communication connections (links) associated with one or more wireless networks such as one or more cellular networks and one or more local wireless networks such as, e.g., WiFi networks. For example, one or more of MCPs 120-1 through 120-N may be in communication with other computing resources in the system environment 100 (e.g., one or more other of MCPs 120-1 through 120-N, one or more edge servers 110-1 through 110-M, cloud platform 102, and/or one or more sensor devices not expressly shown in FIG. 1) via one or more communication links as will be further explained.

It is to be appreciated that many of these MCP devices, as well as the IoT devices connected to them, are compute-constrained (e.g., configured with limited processing capabilities, as well as with limited storage, network, and other resource-related capabilities). The data use cases within the highly distributed system include both data download use cases (e.g., data transferring from the cloud platform 102 to MCPs 120-1 through 120-N) and data upload use cases (e.g., data transferring from MCPs 120-1 through 120-N to the cloud platform 102).

All or parts of highly distributed system 100 in FIG. 1 may also be referred to as an "IoT ecosystem." Such an IoT ecosystem is deployed to manage globally distributed sensors/actuators (and the data that they generate). These ecosystems, as depicted in FIG. 1, often have a tiered model where a central cloud (102) connects to a set of edge servers (110-1 through 110-M). These edge servers in turn interface with sensors and actuators via gateways, e.g., MCPs 120-1 through 120 N (e.g., gateways in "connected cars"). Note that while FIG. 1 illustrates gateways as MCPs, in alternative embodiments, one or more of the gateways may be fixed location (e.g., not currently mobile or not mobile at all) devices.

While not limited thereto, in some embodiments, FIG. 1 represents a "connected car" system environment that comprises a network of MCPs residing in autonomous cars (self-driven vehicles) and/or non-autonomous cars (human-driven vehicles) that are configured to receive data from and send data to: (i) fixed (stationary) computing resources such as edge servers associated with traffic control infrastructure such as, but not limited to, electronic road signs and traffic lights (i.e., road signs and traffic lights that, respectively, have some level of computing, storage and/or electronic data communication capabilities); (ii) one or more other MCPs; and/or (iii) other computing resources. In some embodiments, data that is transferred in the system environment can originate and/or terminate at a cloud platform (e.g., cloud platform 102) depending on the direction of data flow. The communication capabilities of a connected car and road signs can include cellular and local wireless (e.g., WiFi) communication equipment for sending and receiving data. Still further, in some embodiments, sensors and actuators (IoT devices) in the connected car respectively send data to and receive data from the corresponding MCP which functions as a gateway to one or more edge servers, as explained above.

However, management of edge servers is challenging, as highlighted below.

Figure 2:
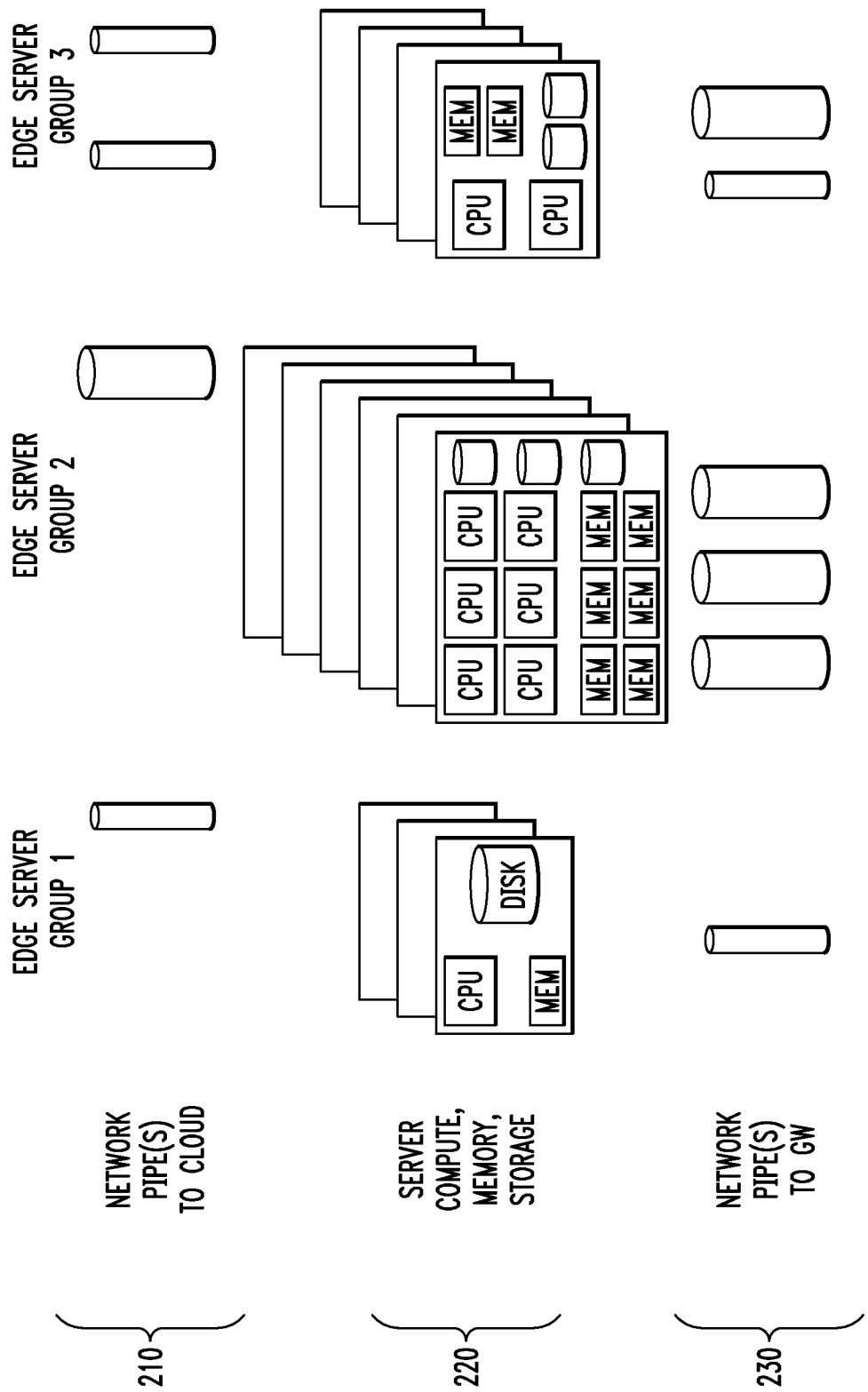
FIG. 2 illustrates heterogenous compute configurations across edge servers with which one or more illustrative embodiments are implemented.

Managing a large number of distributed edge servers is difficult for several reasons. FIG. 2 depicts an example 200 with a variety of configurations and capabilities that can occur across multiple edge server deployments. More particularly, FIG. 2 assists in illustrating three levels of problems that should be addressed for a plurality of heterogenous edge server deployments (edge server group 1, edge server group 2, and edge server group 3):

(i) Network pipes 210 going back to an enterprise (e.g., a centralized cloud 102) can have varied bandwidth and parallelism characteristics. The term "pipes" as illustratively used herein refers to one or more connections, interfaces, networks, protocols, or other communications mechanisms.

(ii) The amount of compute, memory, and storage available on edge servers 220 can also vary.

(iii) Network pipes 230 going to the gateways (e.g., MCPs) can also possess varied bandwidth and parallelism characteristics.

Illustrative embodiments realize that maximizing the business benefit of these edge server deployments presents many challenges. Some of these realized challenges will now be described.

Monitoring the Business Contribution of Edge Servers.

One important reason for the deployment of the edge servers is to bring business benefit by participating in the collection of (valuable) gateway data controlling sensors and actuators for business benefit.

There is currently no way to monitor the business benefit that each edge server deployment brings and, therefore, there is no existing way to adjust edge server configurations and/or make operational changes that would result in a measurable business benefit.

Lack of Cross-Edge Value Output.

Different edge servers process different amounts of data, and control different sensors/actuators, and the "value" that their operation brings is not known or shared across edge servers. This can leave certain edge configurations operating in a low-value state while their peers are generating much more business benefit.

No Existing Methods for Increasing Edge Value.

There is currently no business intelligence that can compare/contrast the value that cross-edge server configurations ("cross-edge" meaning across two or more edge servers or two or more edge server groups) are generating and make changes to those configurations that result in a measurable increase in returns to the business.

No Existing Methods for Quantifying Business Damage to Edge Servers.

Should an edge server configuration undergo security attacks and/or experience operational failures, there is currently no method for quantifying the reduction in business value as a result of these types of events.

Network Tuning Based on Edge Value.

The disparity and heterogeneity of network connectivity options for edge servers (both back to the centralized enterprise (pipes 210 in FIG. 2) and to gateway configurations (pipes 230 in FIG. 2)) typically cannot be tuned and managed properly because there is currently no way to gauge how much business value flows into and out of the gateway for a given level of network connectivity.

Protection of Value-Sharing Between/Across Edge Servers.

The value being processed by edge servers, and the configuration of the servers (e.g., CPU, memory, disk, etc.) and network configuration is sensitive information that should be protected during sharing and validated to ensure that rogue insertion of data (which could negatively impact the business) cannot occur.

Illustrative embodiments overcome the above and other drawbacks associated with existing IoT ecosystems, and address the above and other challenges, by employing techniques to calculate value for a given edge server configuration and then securely sharing that value, and the configuration currently used to realize that value, across an edge server-specific blockchain framework.

As used herein, the terms "blockchain," "chain," "distributed ledger," "ledger," and "blockchain ledger" may be used interchangeably. As is known, the blockchain or distributed ledger protocol is implemented via a distributed, decentralized computer network of compute nodes. A given one of the blockchain compute nodes resides on a client (or client otherwise has access to a blockchain compute node). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In digital ledger technologies such as blockchain, an underlying consensus algorithm is typically used to validate new transactions before they are added to the distributed ledger. Typically, for example, the new transaction is broadcast to all nodes within the network, inspected, a consensus is reached, and the entry is formally committed to the blockchain based on whether consensus is reached that the entry is validated.

In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 3:
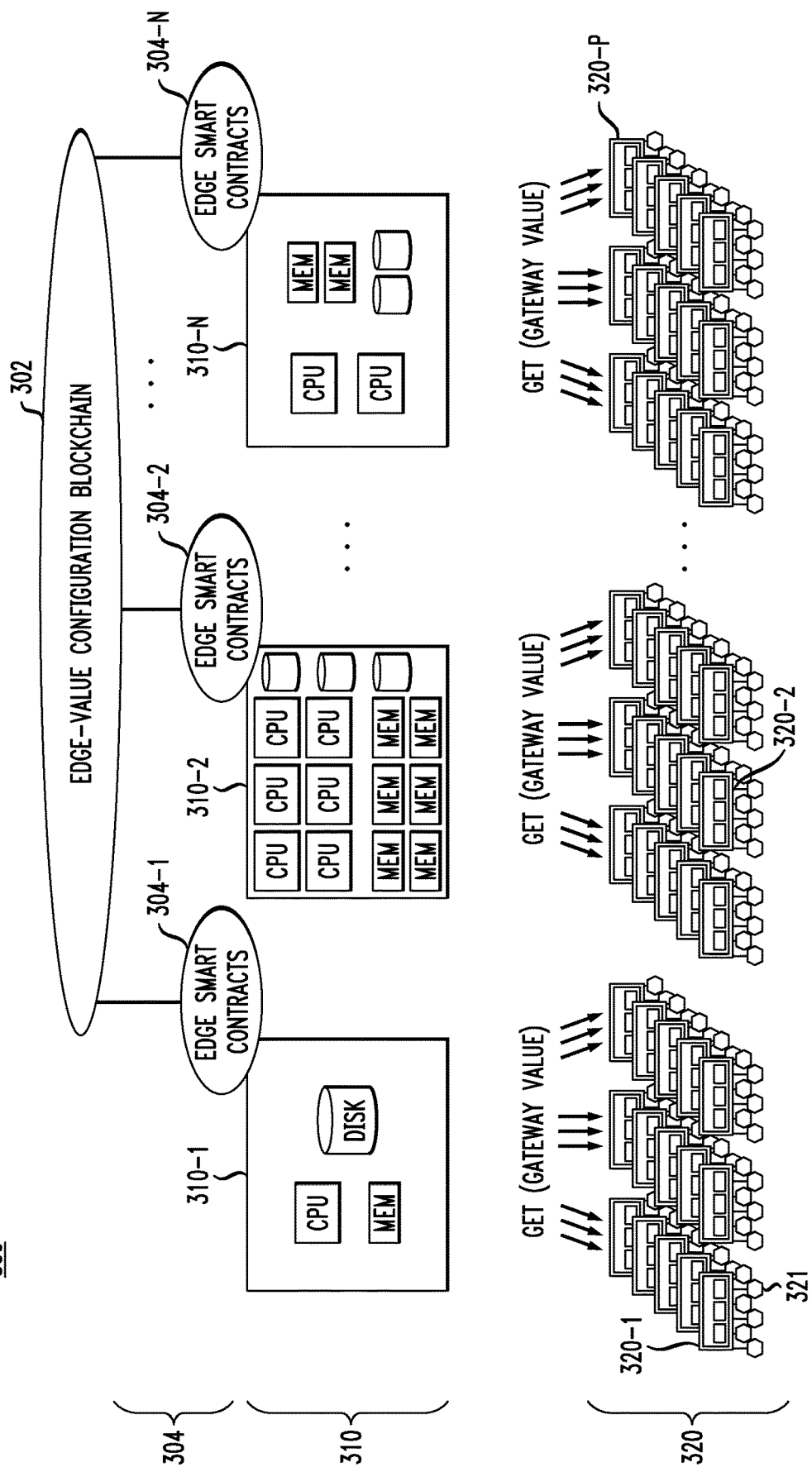
FIG. 3 illustrates a system for managing edge server configuration value according to an illustrative embodiment.

FIG. 3 illustrates a blockchain-based system 300 for managing edge server configuration value according to an illustrative embodiment. As shown, an edge-value configuration blockchain 302 is operatively coupled to a set of edge servers 310-1 through 310-N (collectively edge server layer 310). Each of the set of edge servers 310-1 through 310-N has respective logic residing thereon, or otherwise associated therewith, denoted as edge smart contract modules 304-1 through 304-N (collectively edge smart contract layer 304). The logic in each edge smart contract modules is configured to assist in the management of business value from edge server configurations and insert and retrieve data into the shared edge-value configuration blockchain 302. The term "smart contract" typically refers to program code executing in accordance with a blockchain and containing rules under which the entities agree to interact. The smart contract code automatically facilitates, verifies, and/or enforces the negotiation or performance of an agreement or transaction. Thus, each of the smart contract modules 304-1 through 304-N is configured with program code that executes operations that are consistent with rules defined for the edge servers and the blockchain. As mentioned, such operations include, but are not limited to, management of business value from edge server configurations and data insertion into and data retrieval from the shared edge-value configuration blockchain 302.

As further shown in FIG. 3, the set of edge servers 310 connect (e.g., in a so-called "southbound" direction) to a set of gateway devices 320-1 through 320-P (collectively gateway layer 320). One or more gateway devices 320-1 through 320-P are operatively coupled to each of the edge servers 310-1 through 310-N. In some embodiments, one or more of gateway devices 320-1 through 320-P are MCPs (120-1 through 120-N in FIG. 1). In addition, each of the set of gateway devices 320-1 through 320-P has one or more sensors and/or actuators operatively coupled thereto. To simplify the illustration, only one of the sensors/actuators is denoted with a reference numeral, i.e., sensor/actuator 321. However, as is evident in the figure, each gateway device has one or more sensors/actuator similar to sensor/actuator 321 coupled thereto.

Each of the edge servers 310-1 through 310-N query the value of the data that these gateway devices manage in conjunction with the sensors/actuators coupled thereto (i.e., Get (Gateway_Value). Each of the edge servers 310-1 through 310-N is also configured to keep track of the value of their own data that they generate.

System 300 thus enables data value capture at individual edge server deployments. More particularly, each of the edge servers 310-1 through 310-N interact with the one or more gateway devices under its management in order to ascertain the value of the data currently being generated by the gateway device. In addition, as edge servers connect and analyze that data, they create new data sets that are in themselves assigned a value. One non-limiting example of a gateway data valuation technique that can be employed in one or more illustrative embodiments is disclosed in U.S. Ser. No. 16/163,717, filed on Oct. 18, 2018 and entitled "Data Valuation and Sensor Data Management," the disclosure of which is incorporated by reference herein in its entirety.

This model highlights an event (containing a timestamp and coming from a device name) generating zero or more "readings" (name/value pairs). Gateway devices can generate hundreds and thousands of these types of records and forward them to higher-level servers and/or cloud analytics systems.

Figure 4:
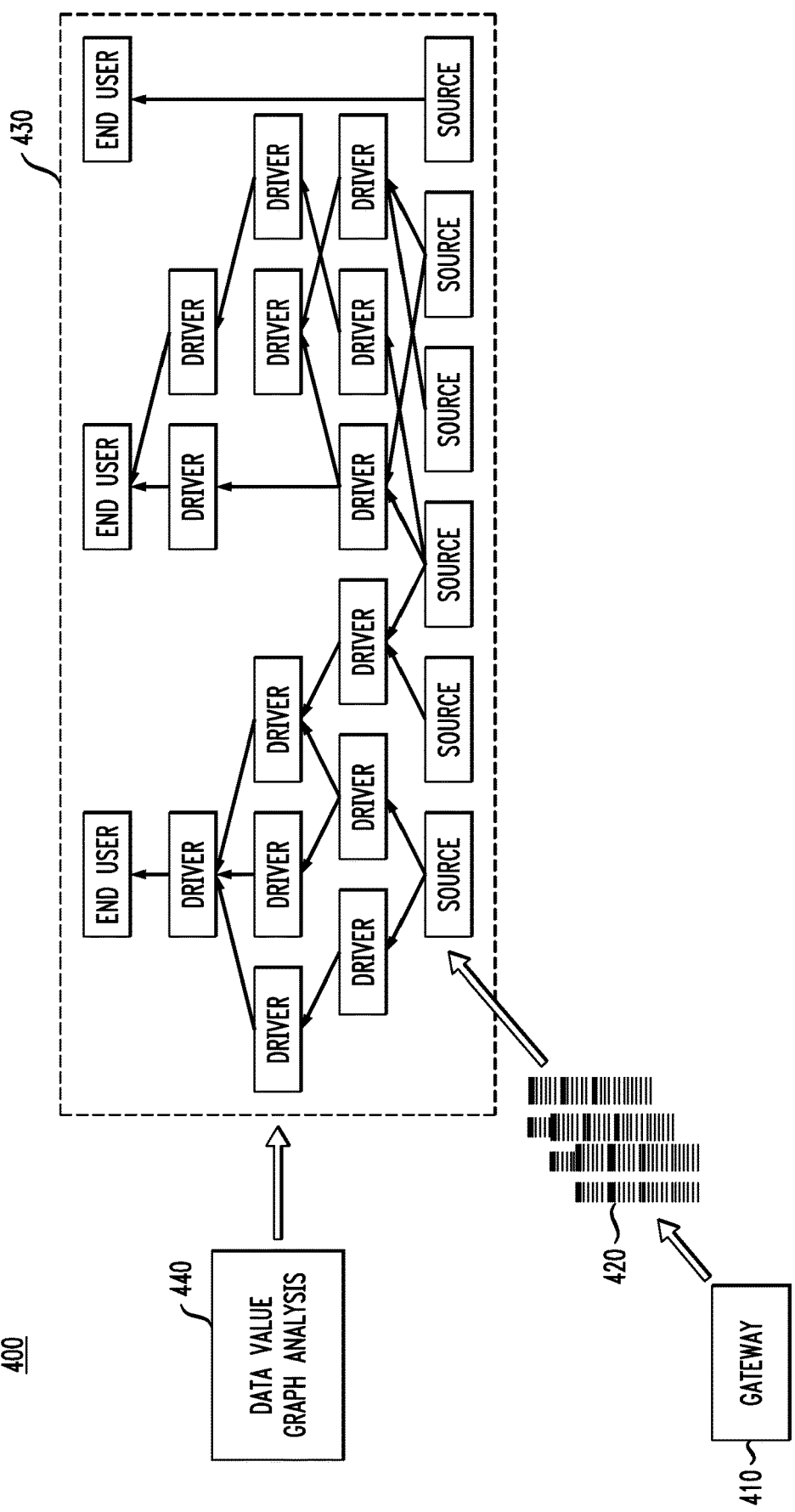
FIG. 4 illustrates an edge server data value graph analysis methodology according to an illustrative embodiment.

By way of example only, FIG. 4 illustrates an edge server (one of edge servers 310-1 through 310-N) performing a data value graph analysis on data coming from one or more gateways (one or more of gateway devices 320-1 through 320-P). As shown in FIG. 4, a sensor data valuation system environment 400 comprises a gateway 410 that generates or otherwise obtains sensor data elements 420 (e.g., readings 420) and provides them to a graph-based data valuation framework 430 which is accessible by a data value graph analysis module 440, as will be further explained below. The data valuation framework depicted as 430 in FIG. 4 is an example of a content workflow valuation algorithm that records the workflow and usage of content. In this embodiment, valuation framework 430 represents the application of business logic and/or other data analytics on the sensor data elements 420 and assignment of value (measure of valuation, as used here) to a piece of content based on such context. More particularly, valuation framework 430 and analysis module 440 track business logic/data analytic activity in the form of a directed acyclic graph and assigns top-level business value to end user results (e.g., how much money was made or saved by using the data). This value is then cascaded down through intermediate (driver) data to the original "source" data (sensor data elements 420) used to generate the business value. By way of example, content workflow valuation techniques are further described in U.S. Ser. No. 15/072,557, filed on Mar. 17, 2016 and entitled "Metadata-based Data Valuation" and U.S. Ser. No. 15/135,817, filed on Apr. 22, 2016 and entitled "Data Value Structures," the disclosures of which are incorporated by reference herein in their entireties.

It is to be appreciated that the valuation framework 430 and analysis module 440 represent only one example of a valuation algorithm that can be applied to the sensor data elements 420. One or more other valuation algorithms, as well as multiple ones, can be applied in various alternative embodiments. For example, alternative valuation frameworks that can be employed to generate valuation for sensor data elements 420 include, but are not limited to:

content processing valuation techniques as described in U.S. Ser. No. 14/863,783, filed on Sep. 24, 2015 and entitled "Unstructured Data Valuation," the disclosure of which is incorporated by reference herein in its entirety;

data protection valuation techniques as described in U.S. Ser. No. 15/136,327, filed on Apr. 22, 2016 and entitled "Calculating Data Value Via Data Protection Analytics," the disclosure of which is incorporated by reference herein in its entirety; and content ingest valuation techniques as described in U.S. Ser. No. 15/135,790, filed on Apr. 22, 2016 and entitled "Data Valuation at Content Ingest," the disclosure of which is incorporated by reference herein in its entirety.

Other valuation algorithms can be used to provide further valuation metrics. By way of non-limiting example, one or more of the data valuation models described in D. Laney, "The Economics of Information Assets," The Center for Infonomics, Smarter Companies presentation, September 2011, may be employed as a data valuation algorithm used by one or more illustrative embodiments. Such valuation models include a set of non-financial models and set of financial models. The non-financial models include: (i) an intrinsic value of information (IVI) model, which represents a measure of a value of the correctness, completeness, and exclusivity (scarcity) of the data set; (ii) a business value of information (BVI) model, which represents a measure of a value of the sufficiency and relevance of the data set for specific purposes; and (iii) a performance value of information (PVI) model, which represents a measure of a value of how the data set affects key business drivers. The financial models include: (i) a cost value of information (CVI) model, which represents a measure of a value of the cost of losing the data set; (ii) a market value of information (MVI) model, which represents a measure of a value of the amount that could be obtained by selling or trading the data set; and (iii) an economic value of information (EVI) model, which represents a measure of a value of how the data set contributes to a financial bottom line.

Regardless of the valuation algorithm used, in one or more illustrative embodiments, an end result is that a file (source data that is filled with sensor data) now has a valuation score(s) associated with it (e.g., financial and/or numerical). Once a file containing sensor data has been valued, a separate algorithm can inspect that value and distribute it amongst all contributing sensor values. Instead of (or in addition to) assigning value to sensor data, in one or more illustrative embodiments, value is also calculated for the physical sensors themselves, and/or the gateways that are forwarding the particular data. This allows an administrator to know which hardware devices are generating the most valuable data across their IoT ecosystem.

Referring back to FIG. 3, all of these statements of data's value from the viewpoint of an individual edge server deployment (each of edge servers 310-1 through 310-N) are passed to the corresponding edge smart contract module 304-1 through 304-N and subsequently stored on the edge-value configuration blockchain 302.

As mentioned above, in one or more illustrative embodiments, each edge server configuration has heterogeneous and varied network connections (e.g., a number of parallel connections of varied maximum bandwidth) to the gateways (southbound configuration, e.g., 230 in FIG. 2). Similarly, in one or more illustrative embodiments, the edge servers are connected to one or more cloud platforms (northbound configuration, e.g., 210 in FIG. 2) with their own heterogeneous and varied connections. This southbound network capability provides an "upper bound of value" coming from the gateways based on how valuable the data is and how much of it can (in theory or in practice) arrive at the edge server configuration. Likewise, the northbound network capability can contribute to this upper bound of value as well. In one or more illustrative embodiments, the network configuration and upper bound of value are also passed from the edge server layer 310 to the smart contract layer 304 and persisted to the blockchain 302. In this manner, data ingest tracking is provided at the edge server layer.

Once the value of data for an edge configuration has been captured, and the network configuration/upper bound of value has been calculated, these data items are combined, according to one or more illustrative embodiments, with the current operational configuration (# of CPUs, memory, disk, # of containers/VMs, etc.) of the edge server and stored into a current edge business output (CEBO) object. This object contains a full picture of the current business value being generated from the edge configuration. In one or more illustrative embodiments, part of the configuration stored in a CEBO object also includes the current set of threats (e.g., operational and/or security) that have been detected recently. This becomes useful for recording "threat to value". It is realized that edge server configurations undergo a variety of threats and attacks, including denial-of-service, failed logins, advanced persistent threats, etc. In accordance with one or more illustrative embodiments, each edge configuration records the detection of any such threat into an edge business threat-to-value (EBTTV) object.

Figure 5:
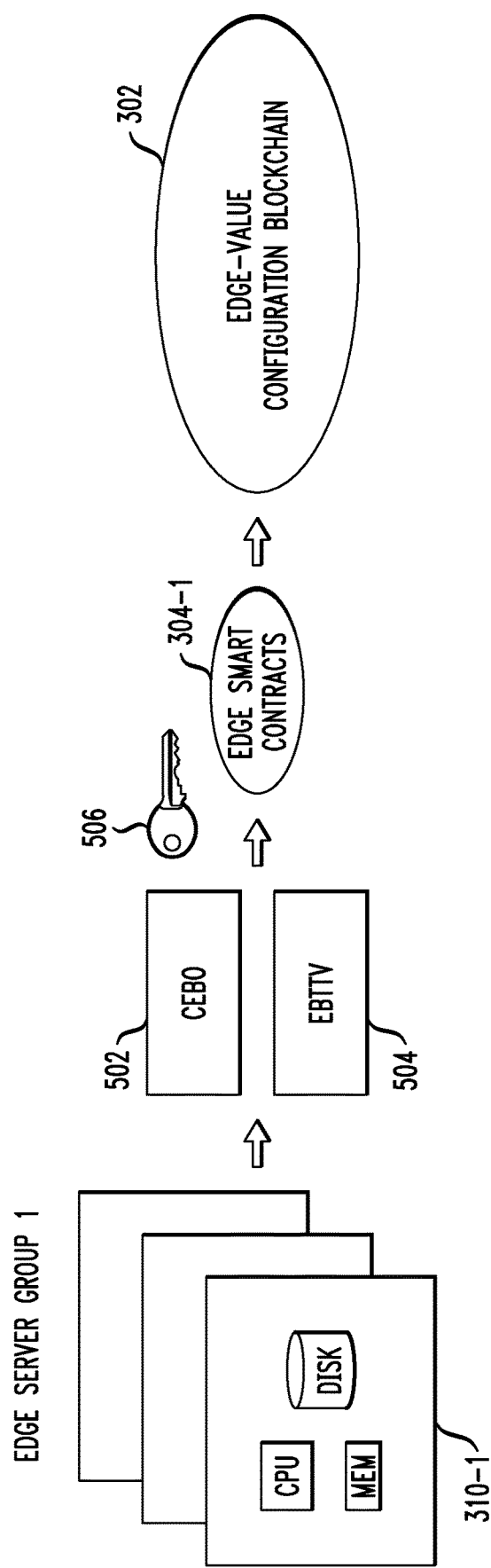
FIG. 5 illustrates a methodology for persisting and sharing value and threats according to an illustrative embodiment.

In one or more illustrative embodiments, the current state of edge business outputs and threats is passed to the smart contract layer. This layer submits the CEBO and EBTTV objects together into a shared blockchain. In some embodiments, a private key known only to each edge configuration is used to validate that the configuration is a legitimate member of the overall enterprise edge ecosystem. FIG. 5 highlights this CEBO and EBTTV object management approach.

More particularly, FIG. 5 illustrates a methodology 500 for persisting and sharing value and threats (CEBO and EBTTV objects) in the context of edge server 310-1 (FIG. 3). As explained above, edge server 310-1 computes a CEBO object 502 and an EBTTV object 504. The two objects 502 and 504 are digitally signed using a private key 506 associated with edge server 310-1. The objects 502 and 504 are then sent to edge smart contract module 304-1 which then inserts the objects onto the edge-value configuration blockchain 302 shared by the other edge servers in the system. Note that the other edge servers validate the data sent by edge server 310-1 by using a public key that corresponds to the private key 506 to confirm the digital signature.

As each edge server configuration contributes its current level of business value and threats (CEBO and EBTTV objects), the rest of the edge server configurations also have visibility into the entire blockchain, providing each configuration and/or a centralized administrator with a "one-ledger" view of cross-edge operational state and value contribution.

Figure 6:
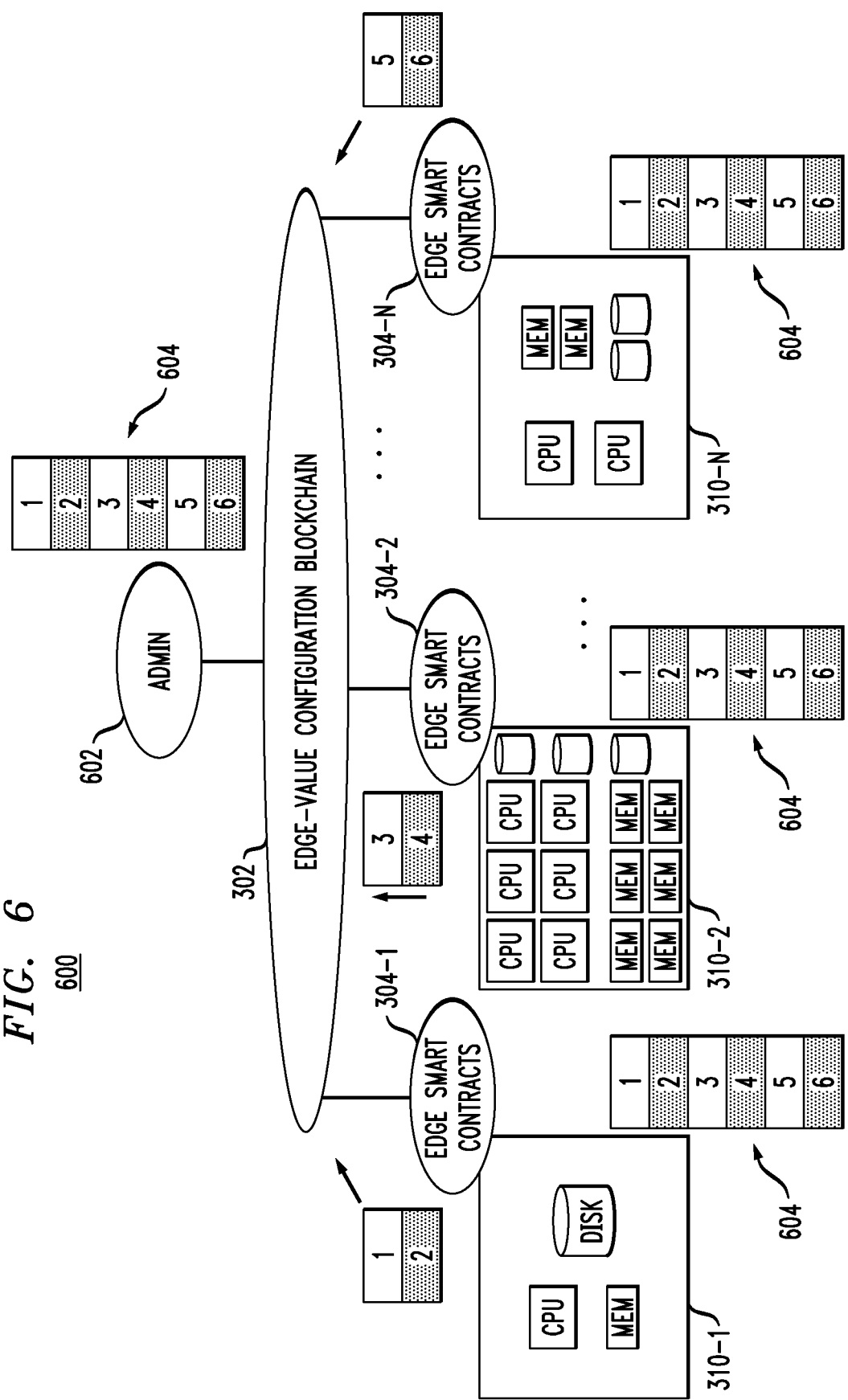
FIG. 6 illustrates a methodology for cross-edge ledger visibility and monitoring according to an illustrative embodiment.

FIG. 6 illustrates a methodology 600 for cross-edge ledger visibility and monitoring according to an illustrative embodiment. More particularly, FIG. 6 illustrates the blockchain-based system of FIG. 3. As shown, while edge server 310-1 contributed data objects 1 and 2, edge server 310-2 contributed data objects 3 and 4, and edge server 310-N contributed data objects 5 and 6, each of edge servers 310-1 through 310-N and a central administrator 602 have cross-edge ledger visibility due to the nature of the blockchain 302 to have an entire (single or common) view 604 of data objects 1 through 6. As such, central administrator 602 is able to consult blockchain 302 and examine which edge server configurations are generating the most value (and why) or determine which edge server configurations are at the most business risk (and why). In some embodiments, these discoveries result in edge server configuration change requests made by the central administrator that increase business value and/or reduce risk. Non-limiting examples of configuration change requests include, but are not limited to: (i) adding more gateways that provide more valuable data; (ii) installing additional (or more bandwidth-enabled) network connections from an edge server to a gateway; and/or (iii) deploying more powerful hardware.

However, in alternative embodiments, each edge server configuration consults its own local ledger copy 604, on its own, and learns from its peers about how it might modify its own configuration to increase value or reduce risk. For example, any number of the following decisions (as well as others) can be made by a local edge server configuration to improve itself: (i) automatically installing security patches that have raised the value of peer configurations; (ii) more frequent polling of gateway devices to increase the amount of high-value data into a system; (iii) similarly, less frequent polling of lower-value gateway data, and/or the stoppage of polling; and/or (iv) increasing the number of containers that are managing gateway data.

In either scenario, such cross-edge ledger visibility advantageously enables decentralized and dynamic adjustment of edge server configurations.

Given the illustrative description of techniques described herein, methodology 700 in FIG. 7 comprises the following steps performed in a system comprising a set of gateway devices operatively coupled to a set of edge servers.

Step 702 obtains data at a given one of the edge servers, wherein at least a portion of the data comprises valuation data attributable to at least one of the one or more gateway devices.

Step 704 sends the data from the given one of the edge servers to a blockchain shared by the set of edge servers for storage of the data on the blockchain.

At least portions of the blockchain-based edge server value management system shown in FIGS. 1-7 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the blockchain-based edge server value management system shown in FIGS. 1-7 may each run on a computer, server, storage device or other processing platform element. A given such element may be viewed as an example of what is more generally referred to herein as a "processing device." An example of such a processing platform is processing platform 800 shown in FIG. 8.

The processing platform 800 in this embodiment comprises a plurality of processing devices, denoted 802-1, 802-2, 802-3, . . . , 802-N, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 of the example embodiment of FIG. 8 is network interface circuitry 814, which is used to interface the processing device with the network 804 and other system components and may comprise conventional transceivers.

The other processing devices 802 of the processing platform 800 are assumed to be configured in a manner similar to that shown for processing device 802-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the blockchain-based edge server value management system, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the blockchain-based edge server value management system. Such components can communicate with other elements of the system over any type of network or other communication media.

As indicated previously, in some embodiments, components of the blockchain-based edge server value management system as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in a system comprising a set of gateway devices operatively coupled to a set of edge servers;
   obtaining data at a given one of the edge servers, wherein at least a portion of the data comprises valuation data attributable to at least one of the one or more gateway devices; and
   sending the data from the given one of the edge servers to a blockchain shared by the set of edge servers for storage of the data on the blockchain;
   wherein the valuation data attributable to the at least one of the one or more gateway devices comprises valuation data assigned via a valuation framework, the valuation framework utilizing at least one or more of logic and data analytics in determining the assigned valuation data; and
   wherein the steps are performed by at least one processing device comprising a processor and a memory.

2. The method of claim 1, wherein at least another portion of the data sent to the blockchain comprises valuation data attributable to the given one of the edge servers.

3. The method of claim 1, wherein the data sent to the blockchain comprises at least one data object that represents information relating to a network configuration between the given one of the edge servers and the at least one of the one or more gateway devices.

4. The method of claim 3, wherein the at least one data object further comprises information relating to an operational configuration of the given one of the edge servers.

5. The method of claim 1, wherein the data sent to the blockchain comprises at least one data object that represents information relating to one or more operational or security threats to the given one of the edge servers.

6. The method of claim 1, further comprising the given one of the edge servers accessing data stored on the blockchain that is attributable to at least another one of the edge servers.

7. The method of claim 6, further comprising changing a configuration of the given one of the edge servers based on the data accessed by the given one of the edge servers from the blockchain or based on an administrator with access to the blockchain.

8. The method of claim 6, wherein the data accessed from the blockchain that is attributable to at least another one of the edge servers further comprises valuation data attributable to the other one of the edge servers.

9. The method of claim 6, wherein the data accessed from the blockchain represents a single view of cross-edge operational and value contributions associated with the set of edge servers in the system.

10. The method of claim 1, further comprising the given one of the edge servers digitally signing the data prior to sending the data to the blockchain for storage.

11. The method of claim 1, wherein the valuation data attributable to at least one of the one or more gateway devices comprises valuation data computed using one or more data valuation algorithms.

12. The method of claim 1, wherein the given one of the edge servers accesses the blockchain through smart contract program code.

13. An article of manufacture comprising a non-transitory processor-readable storage medium having stored therein program code of one or more software programs, wherein the program code when executed by at least one processing device causes the processing device to perform steps of:
   in a system comprising a set of gateway devices operatively coupled to a set of edge servers;
   obtaining data at a given one of the edge servers, wherein at least a portion of the data comprises valuation data attributable to at least one of the one or more gateway devices; and
   sending the data from the given one of the edge servers to a blockchain shared by the set of edge servers for storage of the data on the blockchain;
   wherein the valuation data attributable to the at least one of the one or more gateway devices comprises valuation data assigned via a valuation framework, the valuation framework utilizing at least one or more of logic and data analytics in determining the assigned valuation data.

14. An apparatus comprising at least one processing device, wherein the at least one processing device comprises a processor coupled to a memory configured to:
   in a system comprising a set of gateway devices operatively coupled to a set of edge servers;

obtain data at a given one of the edge servers, wherein at least a portion of the data comprises valuation data attributable to at least one of the one or more gateway devices; and send the data from the given one of the edge servers to a blockchain shared by the set of edge servers for storage of the data on the blockchain;

wherein the valuation data attributable to the at least one of the one or more gateway devices comprises valuation data assigned via a valuation framework, the valuation framework utilizing at least one or more of logic and data analytics in determining the assigned valuation data.

15. The apparatus of claim 14, wherein at least another portion of the data sent to the blockchain comprises valuation data attributable to the given one of the edge servers.

16. The apparatus of claim 14, wherein the data sent to the blockchain comprises at least one data object that represents information relating to a network configuration between the given one of the edge servers and the at least one of the one or more gateway devices.

17. The apparatus of claim 16, wherein the at least one data object further comprises information relating to an operational configuration of the given one of the edge servers.

18. The apparatus of claim 14, wherein the data sent to the blockchain comprises at least one data object that represents information relating to one or more operational or security threats to the given one of the edge servers.

19. The apparatus of claim 14, wherein the at least one processing device is further configured to access, by the given one of the edge servers, data stored on the blockchain that is attributable to at least another one of the edge servers.

20. The apparatus of claim 19, wherein a configuration of the given one of the edge servers is changed based on the data accessed by the given one of the edge servers from the blockchain or based on an administrator with access to the blockchain.

* * * * *